United States Patent [19]

Hsu

[11] 4,194,766
[45] Mar. 25, 1980

[54] SELF-ALIGNING RING JOINT FOR JOINING CONCRETE PIPES HAVING ENDS ADAPTED FOR USE THEREWITH

[76] Inventor: Mitchell M. C. Hsu, 1-1, Alley 17, Lane 96, Ho Ping East Rd., Sec. 2, Taipei, Taiwan

[21] Appl. No.: 869,772

[22] Filed: Jan. 16, 1978

[51] Int. Cl.² ............................................. F16L 17/02
[52] U.S. Cl. .................................. 285/110; 285/345; 285/369
[58] Field of Search ............ 277/207 A; 285/DIG. 14, 285/110, 230, 231, 345, 369, 112

[56] References Cited

U.S. PATENT DOCUMENTS

| 2,245,153 | 6/1941 | McWane | 285/231 |
| 2,685,462 | 8/1954 | Lofquist | 285/369 X |
| 3,186,741 | 6/1965 | Kurtz | 285/230 X |
| 3,575,430 | 4/1971 | Alpine | 285/230 X |
| 3,690,701 | 9/1972 | Gramain | 285/345 X |
| 3,857,589 | 12/1974 | Oostenbrink | 277/207 A |

FOREIGN PATENT DOCUMENTS

| 1188879 | 3/1965 | Fed. Rep. of Germany | 285/110 |
| 1033204 | 4/1953 | France | 285/112 |
| 1087948 | 9/1954 | France | 285/112 |

*Primary Examiner*—Dave W. Arola
*Attorney, Agent, or Firm*—Le Blanc, Nolan, Shur & Nies

[57] ABSTRACT

A self-aligning ring joint of the type used for joining concrete pipes, said ring joint including a novel sealing ring which in conjunction with specially adapted ends of the concrete pipes to be joined insures that the ring joint will maintain an equilibrium position whereby it is always symmetrical to the normal plane between the two pipe ends.

4 Claims, 3 Drawing Figures

SELF-ALIGNING RING JOINT FOR JOINING CONCRETE PIPES HAVING ENDS ADAPTED FOR USE THEREWITH

BACKGROUND OF THE INVENTION

This invention relates to a self-aligning ring joint for joining concrete pipes of the type employing sealing rings made of a resilient and flexible material, and more particularly, to in improved sealing ring which when used with concrete pipes that have ends of a special configuration, will serve to maintain the ring joint in a central position between two adjacent pipe ends.

Conventional ring joints employing sealing rings generally comprise a ring made of cast iron or the like and a sealing ring provided internally at each end thereof, said sealing ring including a main ring having an inside diameter approximately equal to the outside diameter of a pipe end and an integral lip ring, or mouth, depending therefrom having an inside diameter substantially smaller than the outside diameter of the pipe end so that when a pipe end is pushed into one end of the ring joint the mouth of the sealing ring will expand and stretch around the pipe end, forming a watertight seal.

One major defect of such ring joints is that there is no way of accurately aligning the ring joint so that the open ends of each pipe are positioned at the exact center of the ring joint. Due to this fact, the amount of pressure on each sealing ring will not be equal. Another inherent defect of such ring joints is that as the mouth of the sealing ring is stretched over the end of the pipe with no external pressure to offset the effects of this outward expansion, the sealing ring will lose its flexibility and resilience, causing it to stretch or crack, whereby it resistance to high pressure within the joint is greatly decreased, greatly increasing the chances of leakage. Due to the same reason, ie. lack of external pressure, or prestress, to the sealing ring, any shifting of the pipe is likely to break the watertight seal.

It is a purpose of the present invention, therefor, to eliminate or improve the above said defects and to provide an improved ring joint capable of aligning itself so that two pipe ends joined thereby will always be positioned centrally of the ring joint so as to equalize liquid pressure acting on each of the sealing rings.

It is a further purpose of the present invention to provide such a ring joint having improved sealing rings which enable the ring joint to maintain proper alignment between the pipe sections joined thereby.

It is yet a further purpose of the present invention to provide a sealing ring for such a ring joint which under deformation is capable of being compressed between said ring joint and the pipe ends joined thereby to insure a watertight seal, of enabling the ring joint to align itself properly, of enabling the ring joint to accommodate shifting of the pipes, and to generally increase the useful life of the ring joint.

It is another purpose of the present invention to provide a special type of end for pipes to be joined in the manner to be described so that the force applied to the sealing rings thereby enables proper alignment of the ring joint.

It is yet another purpose of the present invention to provide a durable seal even after ageing has caused the material of the sealing rings to loose its elasticity.

BRIEF DESCRIPTION OF THE DRAWINGS

Other purposes and advantages will become apparent as the invention is now described in detail with reference to the appended drawings, wherein.

DETAILED DESCRIPTION OF THE INVENTION

Figure 1:
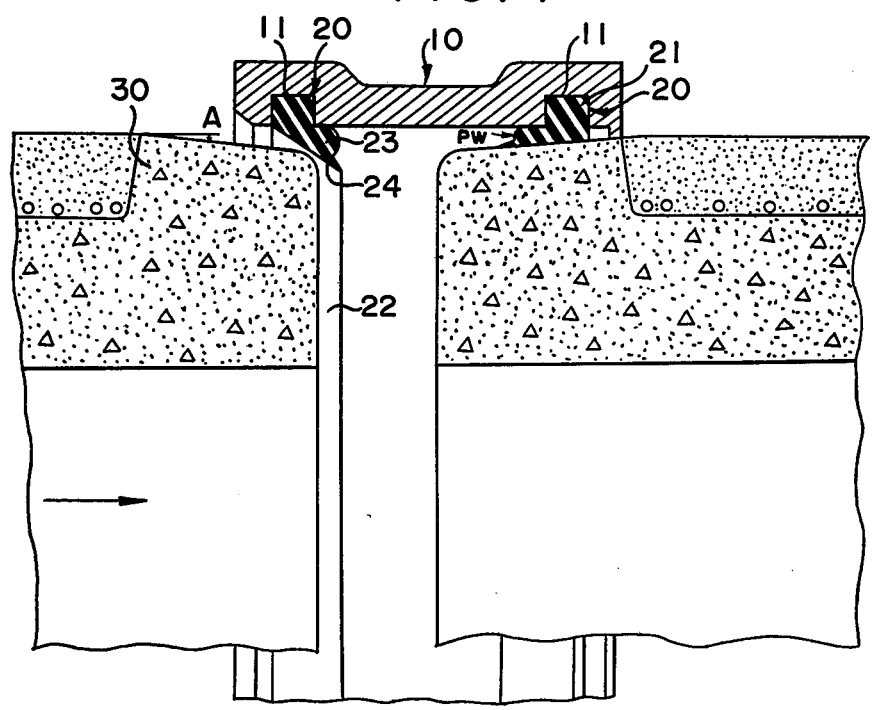
FIG. 1 is a view in cross section of a ring joint according to the present invention and the respective ends of two concrete pipes to be joined thereby.

As shown in FIG. 1, a ring joint according to the present invention includes a relatively rigid outer ring or collar 10 of a suitable material such as cast iron or FRP and two sealing rings 20—20, each sealing ring being disposed in a suitable groove 11 provided internally of the outer ring 10 at each end for the purpose of securing the sealing ring 20. The novel configuration of the sealing ring 20 can be seen in FIG. 2. The sealing ring 20 is made of a suitable elastic material such as rubber and comprises a main ring 21 and a mouth 22. The mouth 22 of the sealing ring 20 is formed integrally therewith, the inside diameter thereof gradually decreasing to a diameter less than the smallest outside diameter of the pipe end which it is meant to receive. Due to the gradually decreasing diameter of the mouth portion 22, a tapered face 24 is presented to the pipe end to be joined.

One of the purposes of the present invention as mentioned hereinabove, is to store up compression stress by means of deformation to the sealing ring between the pipe end and the ring joint 10. To accomplish this, there is provided on said sealing ring 20 an integral flange 23 along the outer circumference of the mouth 22.

Figure 3:
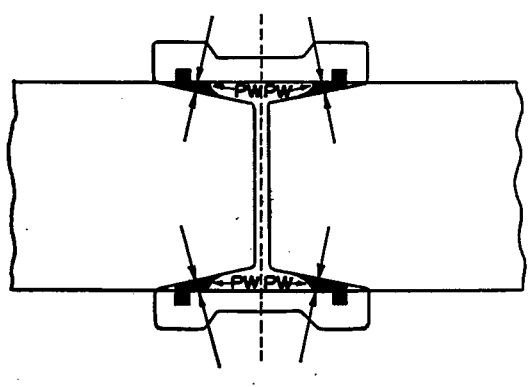
FIG. 3 is a diagram showing how pressure is equalized to each sealing ring, maintaining the desired alignment between pipes and ring joint.

To take full advantage of the benefits of the novel sealing ring just described, the present invention also includes a special type of pipe end. As shown in FIGS. 1 and 3, the ends of the concrete pipes 30—30 to be joined are tapered a suitable angle A from the level. It is the combination of the ends of the pipe 30 and the compression stress stored in the flange 23 that enables self-alignment by the ring joint.

Figure 2:
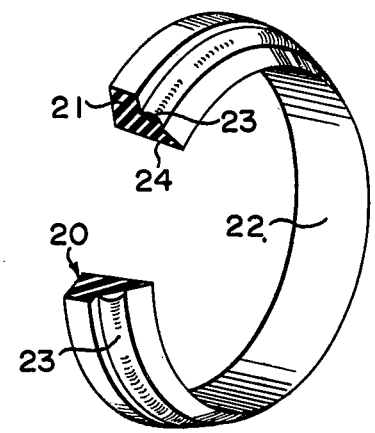
FIG. 2 is a view in partial section of a sealing ring according to the present invention.

With further reference to FIGS. 2 and 3, the main ring 21 of one of the sealing rings 20—20 is fitted tightly in each of the grooves 11—11 of the outer ring 10. When a pipe 30 is pushed therethrough, the mouth 22 of the sealing ring 20 will expand and be stretched over the end of the pipe 30 forming a water tight seal. When the pushing force is released against the pipe 30, it will slide back slightly to an equilibrium condition so that the friction force between seal and pipe end will be balanced with the reaction component due to the taper effect. This forms the initial compression between pipe end 30 against sealing ring 20 to obtain initial water tightness. At the same time, the pushing of the pipe 30 through the sealing ring 20 will cause the flange 23 to be pushed against the outer ring 10 and thereby deformed under compression. When pushing force is released pressure built up in the compressed flange 23 will cause the pipe to slide back to a point where the pressure against the sealing ring 20 from both the outer ring 10 and the tapered face of the pipe 30 is stabilized, storing compression stress in the flange 23.

The advantages of such stored compression stress due to deformation of Flange 23 are many. In addition to strengthening the seal generally, when there is high liquid pressure (Pw) in the joint, this pressure will act against the flange and due to the prestress, this will tighten the seal between the sealing ring 20 and the pipe 30. Therefor, the greater the pressure in the joint, the greater proportionately will be the seal. Also, due to the stabilized pressure mentioned above, during installation the ring joint will always align itself properly, ie. while pushing force is applied to the pipes 30—30 the ring joint will adjust itself to and maintain itself in a position where the two pipe ends are symmetrical to each other, i.e. the ring joint finds its central position between the pipes as shown in FIG. 3.

After installation the sealing ring is always positioned over the level portion of the pipe. Due to the fact that the sealing ring 20 according to the present invention is always positioned on a tapered face and the pipe ends are spaced apart, there is a "ball joint" effect so that the angle of deflection possible is greatly increased. For this reason, no bedding work or saddle structures are required when being installed. There is no need for expensive and time consuming backfill before installation, as the ring joint can accommodate settling without effecting the quality of the seal.

Thus the self-aligning ring joint assembly shown in FIG. 1 joins two concrete pipes having adjacent ends, the external surfaces of which ends decreasingly taper toward each other at the angle A with respect to the pipe axes. A collar 10 extends between and over both pipe ends with internal annular grooves 11 in the collar mounting integral resilient sealing rings. Each sealing ring comprises an outer peripheral body portion 21 mounted in a groove and a mouth portion 22 extending around its inner periphery. Each mouth portion 22 has an integral annular flange 23 around its outer circumference disposed longitudinally inwardly of the groove in which the ring is mounted and a tapered annular surface 24 around its inner circumference, the mouth surfaces tapering longitudinally and decreasingly inwardly with respect to the opposite ends of said collar from a pipe end entrance region of greater diameter than the adjacent pipe end outer surfaces to a region of smaller diameter than the adjacent pipe end, whereby when pipes are pushed into the ends of the collar the pipe ends engage the tapered ring surfaces 24 and deform the resilient flange 23 under compression between the collar and the pipe end surfaces.

In this way there is provided an improved, self-aligning ring joint which, in conjunction with concrete pipes having tapered ends, provides a greatly increased useful life and a watertight seal which automatically tightens in direct proportion to increases in liquid pressure within the joint, and which is able to accommodate shifting of the pipes without breaking the seal.

What I claim is:

1. A self-aligning ring joint of the type used for joining concrete pipes, said ring joint including an outer rigid ring member adapted to bridge adjacent pipe ends and having suitable grooves provided internally at opposite ends thereof, each groove being adapted for securing a sealing ring, two sealing rings made of a suitably elastic material, each sealing ring comprising a main body portion tightly fitted into one of said grooves and a depending mouth portion having an internal tapered annular surface, said mouth portion being provided integrally along the outer circumference thereof with an annular protuberant flange which in conjunction with inserted pipes having similarly tapered ends is deformed between said pipe ends and said ring member when said pipes have been joined by said ring joint whereby compression stress is stored in said flanges, said flange being deformed into tight surface engagement with said ring member and said tapered surface of the ring mouth being pressed into tight surface engagement with the adjacent tapered end of the inserted pipe; said ring joint being characterized in that due to the compression stress stored in said flanges under deformation between the outer circumferential surfaces of said tapered pipe ends and the surrounding corresponding tapered inner circumferential surfaces of said depending mouth portions, two flanges of each ring joint will, whenever there is external force, from time to time tend to return the stored compression stress between said outer ring member and the outer circumferential surface of said tapered pipe ends to simultaneously clamp and push back the penetrating pipes until the resulting pressure and compression stress at both ends of the ring joint is finally equal, in the case of which said ring joint finally finds its central position between the pipe ends.

2. The ring joint defined in claim 1 wherein the inside diameter of each sealing ring gradually decreases from the ring body to an end of the mouth portion so that the diameter of said end of the mouth portion is smaller than the smallest outside diameter of the tapered portion of the corresponding pipe end, thereby presenting a tapered ring face to the pipe end as said pipe end is pushed thereinto, said tapered face tapering in the same direction as the push force whereby said mouth portion is deflected toward said ring member as the pipe end inserted thereinto.

3. In a self-aligning ring joint assembly for joining two concrete pipes having adjacent ends, the external surfaces of which ends decreasingly taper toward each other, a rigid collar adapted to extend between and over both of said ends, internal annular grooves at said collar ends, integral resilient sealing rings mounted in each groove, each sealing ring comprising an outer peripheral body portion tightly fitted in a groove and a mouth portion extending around its inner periphery, each mouth portion having an integral annular flange around an outer circumference disposed longitudinally inwardly of the groove in which the sealing ring is mounted and a tapered annular surface around its inner circumference, said mouth surfaces tapering longitudinally and decreasingly inwardly with respect to the opposite ends of said collar from a pipe end entrance region of greater diameter than the adjacent pipe end outer surfaces to a region of smaller diameter than the adjacent pipe end located longitudinally inwardly of the respective groove, whereby when pipes are pushed into the ends of said collar said pipe ends engage and are surrounded by the tapered ring surfaces and deform said resilient flanges under compression between the collar and the tapered pipe end surfaces, said flanges being deformed into tight surface engagement with said collar and said tapered ring surfaces being pressed into tight surface engagement with the adjacent tapered external end surfaces of the pipes.

4. In the ring joint assembly defined in claim 3, each said mouth surface extending longitudinally for the entire width of the sealing ring and being disposed at a more acute angle than the associated pipe end surface with respect to the central axis of said collar.

* * * * *